United States Patent

Schmidt

[11] Patent Number: 5,517,070
[45] Date of Patent: May 14, 1996

[54] DRIVE UNIT, IN PARTICULAR AN ELECTROMOTIVE WINDOW - LIFT DRIVE FOR A MOTOR VEHICLE

[75] Inventor: Kurt Schmidt, Werbach, Germany

[73] Assignee: Siemens Aktiengesellschaft, München, Germany

[21] Appl. No.: 188,620

[22] Filed: Jan. 27, 1994

[30] Foreign Application Priority Data

Jan. 27, 1993 [EP] European Pat. Off. ............ 93101215

[51] Int. Cl.⁶ .................................................. H02K 5/00
[52] U.S. Cl. ........................... 310/89; 310/83; 310/90
[58] Field of Search .......................... 310/83, 90, 89; 384/245, 246; 74/425

[56] References Cited

U.S. PATENT DOCUMENTS

| | | | |
|---|---|---|---|
| 3,300,260 | 1/1967 | Stern | 384/246 |
| 3,389,608 | 6/1968 | Moskowitz | 384/246 |
| 3,747,998 | 7/1973 | Klein et al. . | |
| 4,885,948 | 12/1989 | Thrasher, Jr. | 74/425 |
| 5,015,897 | 5/1991 | Inagaki | 310/83 |
| 5,144,738 | 9/1992 | Oyafuso | 310/90 |
| 5,184,039 | 2/1993 | Kraft | 310/89 |
| 5,213,000 | 5/1993 | Saya | 74/425 |

FOREIGN PATENT DOCUMENTS

| | | |
|---|---|---|
| 0188801 | 5/1987 | European Pat. Off. . |
| 2080160 | 11/1971 | France . |
| 2402333 | 3/1979 | France . |
| 2044858 | 3/1971 | Germany . |
| 8128186 | 6/1982 | Germany . |
| 8323218 | 10/1984 | Germany . |
| 2016213 | 9/1979 | United Kingdom . |

*Primary Examiner*—R. Skudy
*Attorney, Agent, or Firm*—Kenyon & Kenyon

[57] ABSTRACT

A drive unit, in which an unattached shaft end of a drive shaft abuts axially against an abutment surface of a housing part. The abutment surface is crown-faced and with respect to the abutting, unsupported and unattached (i.e., free) shaft end and thereby prevents the drive shaft from deflecting eccentrically from radial adjusting forces. Given an eccentric abutment, the abutment surface leads the drive shaft back to its centrical axial position.

9 Claims, 2 Drawing Sheets

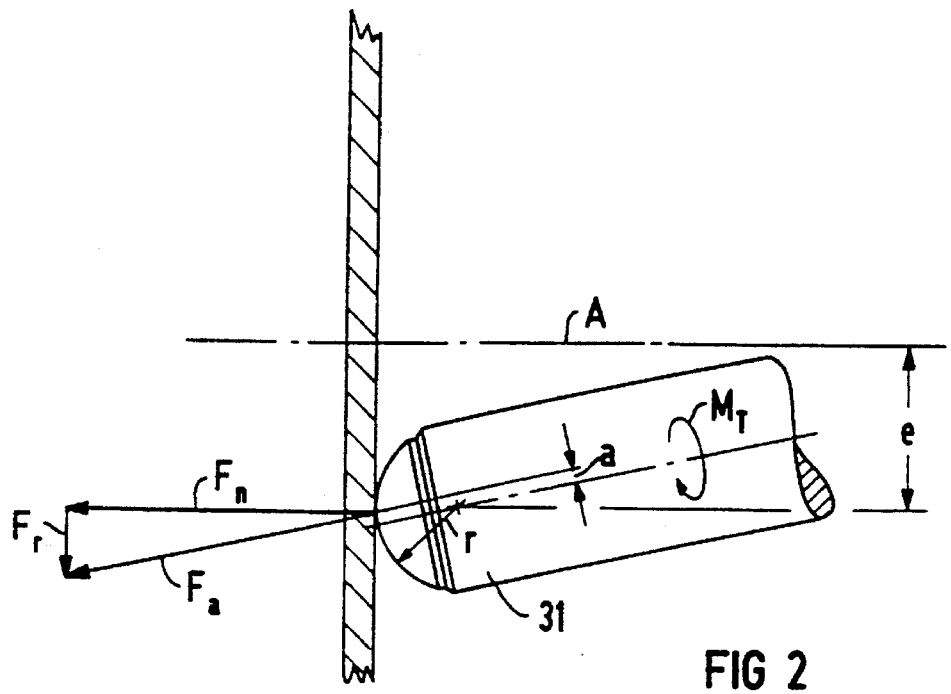
PRIOR ART
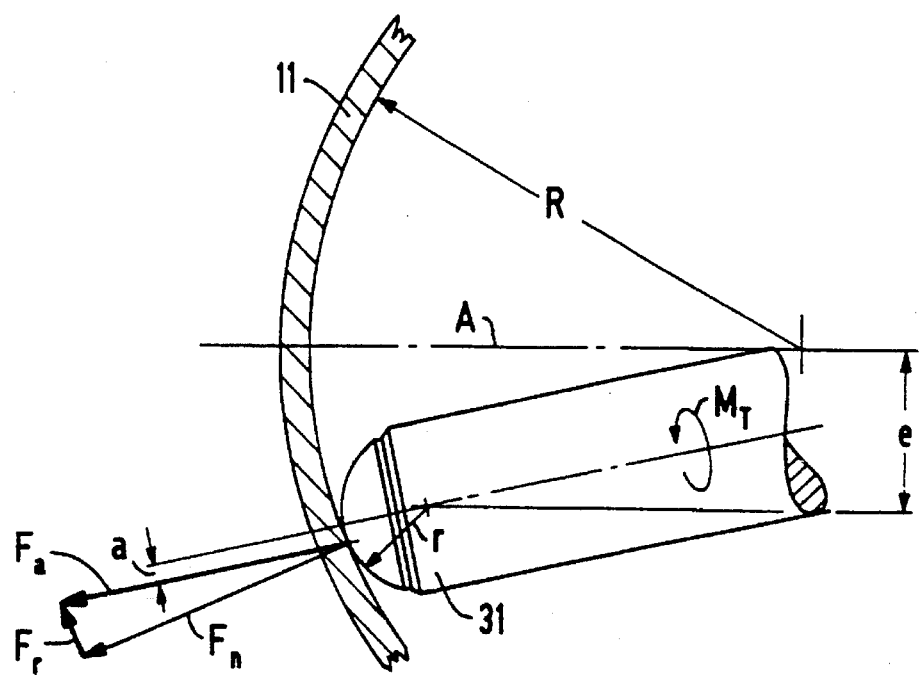

DRIVE UNIT, IN PARTICULAR AN ELECTROMOTIVE WINDOW - LIFT DRIVE FOR A MOTOR VEHICLE

BACKGROUND OF THE INVENTION

The present invention relates to a drive unit and in particular, an electromotive window-lift drive for a motor vehicle.

The German Patent Application DE-U-83 23 218 discusses an electromotive window-lift drive for a motor vehicle having a traversing drive shaft, which accommodates the laminated core of the rotor and the commutator of a commutator motor inside a motor housing. A worm gear which mates with a worm wheel is accommodated in an adjacent gear housing. The drive shaft is supported at each of its outer shaft ends by a cup-shaped bearing located in the gear housing and the motor housing, respectively. The axial forces acting by way of the worm gear on the drive shaft are absorbed in one direction of rotation by an axial-play adjusting screw in the gear housing and, in a second direction, by the flat abutment surface of the front end of the motor housing running perpendicularly to the axis of the drive shaft. The front ends of the drive shaft run up against this abutment surface, preferably via a thrust mushroom-type head.

Besides the axial force already mentioned, radial forces and tangential forces develop at the worm gear toothing and also act on the drive shaft. The total force resulting from these two forces causes a slight elastic deformation of the shaft. The extent of the elastic deformation of the shaft may be such that the front-end, thrust mushroom-type heads of the drive shaft drift are eccentrically displaced on the housing-side outer bearings.

In particular, if the bearing arrangement provided for the drive shaft comprises two bearings on the side of the worm shaft (i.e., in the gear-housing) and an overhung bearing arrangement results for the motor-side, unsupported and unattached (i.e., free) shaft end, when this shaft end abuts against the flat abutment surface of the motor housing, the unattached shaft end may be bent eccentrically to such an extent that a collision can occur between the laminated core of the rotor accommodated by the drive shaft and the diametrically opposed magnet segments of the stator in the air-gap space. To prevent such a collision, the drive shaft requires thicker dimensions or must be provided with additional support means to protect it from bending out radially—such as in the case of the German Utility Model DE-U-81 28 186.

Therefore, there is a need to minimize an eccentric bending of the unsupported and unattached (i.e., free) motor-side shaft end of the drive shaft using simple construction and assembly-technology means.

SUMMARY OF THE INVENTION

The above need is achieved in accordance with the present invention by providing a convex abutment surface abutting the unsupported and unattached (i.e., free) shaft end which leads the drive shaft back to its centrical axial position.

Since the abutment surface for the free end of the drive shaft can be formed in accordance with the present invention during production of the motor housing, separate radial support means or a reinforced design of the drive shaft itself or a bearing accommodating the drive shaft the free shaft end is not required. In the present invention, the unsupported and unattached (i.e., free) end of the drive shaft which usually tends to deflect eccentrically is led back compulsorily to the center of the convex abutment surface and, thus, in the direction of the neutral axis of the drive shaft. A crown-face (convex) abutment surface, which is especially simple and, at the same time, precisely aligned to the axis of the drive shaft, can be advantageously achieved with simple means, in particular in the case of a cup-shaped motor housing having an abutment surface formed in the front side of the cup base for the unsupported and unattached (i.e., free) shaft end of the drive shaft.

BRIEF DESCRIPTION OF THE DRAWINGS

FIG. 2 illustrates the forces acting on an eccentrically displaced, unsupported and unattached (i.e., free) shaft end of the drive shaft in the case of a known, flat abutment surface.

FIG. 3 Illustrates the forces acting on an eccentrically displaced, unsupported and unattached (i.e., free) shaft end of the drive shaft in the case of an abutment surface having a crown-face design in accordance with the present invention.

DETAILED DESCRIPTION

Figure 1:
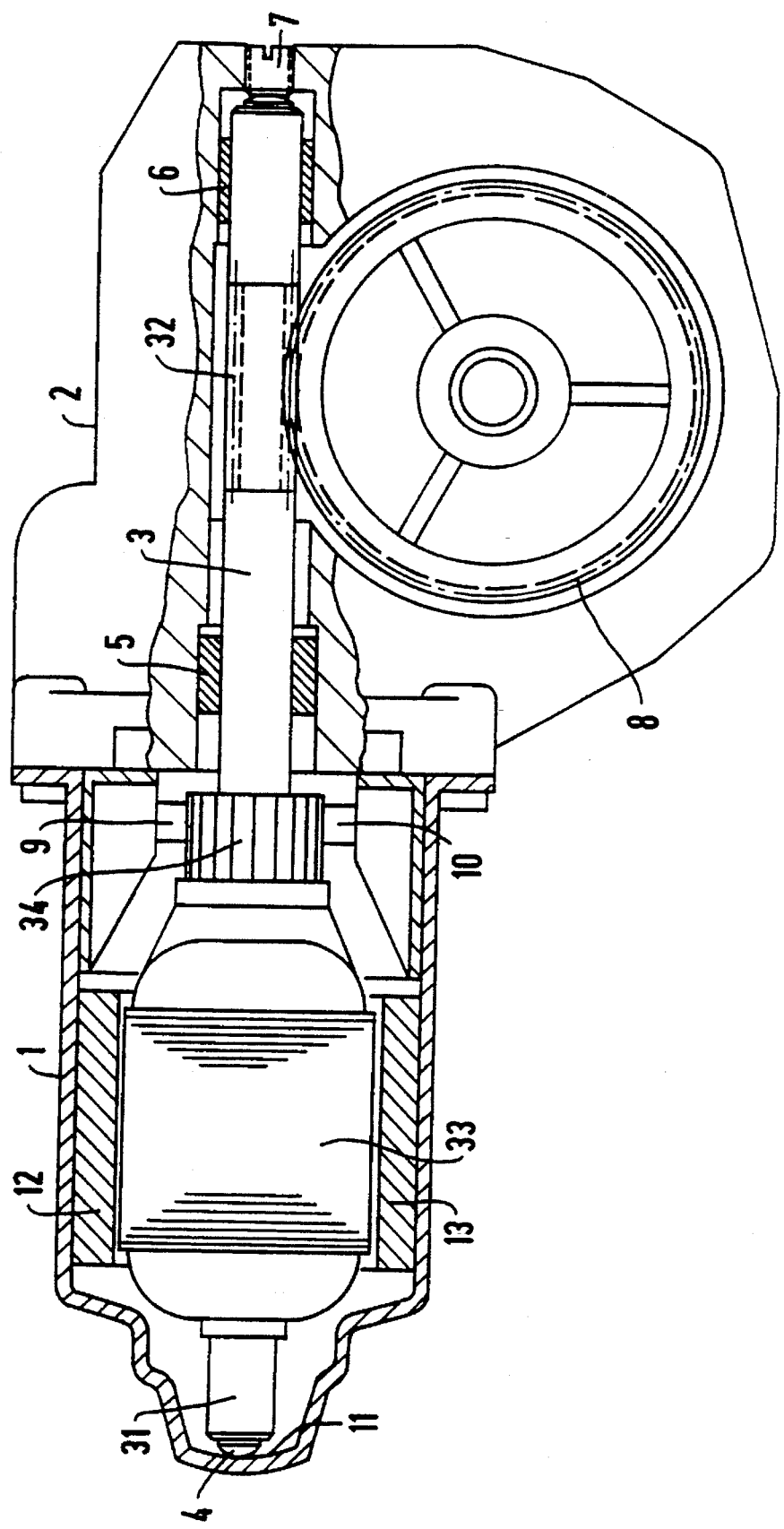
FIG. 1 illustrates an axial longitudinal section through an electromotive window-lift drive for a motor vehicle.

FIG. 1 depicts an axial longitudinal section of an electromotive window-lift drive for a motor vehicle. The drive includes a motor housing 1 of a commutator motor and a gear housing 2 of a worm gear flange-mounted to the motor housing I. The drive may be used, for example, to drive a bowden-cable pulley for a cable-operated window lift. A drive shaft 3 is supported in the longitudinal direction of the electromotive window-lift drive. On its left shaft end, the drive shaft 3 accommodates the laminated core of the rotor 33 provided with a rotor (armature) winding. Between the laminated core of the rotor 33 and a first bearing 5, the drive shaft 3 accommodates a commutator 34. On its right shaft end, the drive shaft 3 accommodates a worm gear 32 that mates with a worm wheel 8. On the motor side, saucer-shaped permanent magnets 12, 13 are arranged radially outward from the wound laminated core of the rotor 33 thereby defining an air-gap space on the periphery of the motor housing. Also on the motor side, brushes 9, 10 are assigned to the commutator 34 and wipe against its surface.

The drive shaft 3 is advantageously supported on a first side of the worm gear 32 with the first bearing 5 and a second side of the worm gear 32 with a second bearing 6. The bearings 5, 6 are preferably sliding bearings. Thus, the motor-side end of the drive shaft 3 has an overhung bearing arrangement. To absorb the axial forces acting upon the drive shaft because of the worm gear, the direction of which depends on the direction of rotation of the commutator motor, the drive shaft 3 can abut with its right unsupported and unattached (i.e., free) end by way of a thrust mushroom-type head, for example against an axial-play adjusting screw 7. Axial forces occurring when the worm wheel 8 is driven counter clock wise are absorbed with the shaft's (3) left, unsupported and unattached (i.e., free) shaft end 31 by way of a front-side, plastic, thrust mushroom-type head 4 installed as a separate component part in the drive shaft 3. The head 4 abuts against the front-side, crown-face (concave) abutment surface 11 of the motor housing 1. The radius of curvature R of the crown-face abutment surface 11 of the housing part (motor housing 1) is slightly greater than the radius of curvature r of the thrust mushroom-type head 4 (see FIG. 3).

FIG. 2 clarifies the forces acting upon the unsupported and unattached (i.e., free) shaft end 31 when it abuts against a flat abutment surface provided, as is known, perpendicularly to the axial direction A of the drive shaft 3. Given an eccentricity e between the unsupported and unattached (i.e., free) shaft end 31 of the drive shaft 3 and the centrical abutment of this shaft against the housing-side abutment surface and based on the indicated force triangle comprising a normal force Fn and an axial force Fa, a radially, outwardly directed radial force Fr results. The radial force Fr acts upon the unsupported and unattached (i.e., free) shaft end 31, and in addition to the bending caused by the worm-gear force, acts in a self-energizing manner in the sense of a further expanded eccentricity. Since the center of rotation of the thrust mushroom-type head 4 having the radius of curvature r does not coincide with the contact point of the unsupported and unattached (i.e., free) shaft end 31 with the housing-side abutment surface, but rather is offset by the clearance a, a wobble moment $M_T$ is formed. The wobble moment $M_T$ leads the unsupported and unattached (i.e., free) shaft end 31 and, thus, the drive shaft 3 away from the axial direction A of the drive shaft 3.

In the area of the overhung bearing arrangement of the laminated core of the rotor 33, the drive shaft 3 can be bent, as a result of the forces acting in this manner, to such an extent that the laminated core of the rotor 33 and the adjacent, saucer-shaped, permanent magnets 12, 13 of the stator on the air-gap side can come into contact. Such a contact generates noise and diminishes the capacity of the entire drive.

FIG. 3 illustrates the crown-face (convex) abutment surface 11 of the motor-housing-side according to the invention. The crown-face (convex) abutment surface 11 has a radius of curvature R, which is slightly greater than the radius of curvature r of the thrust mushroom-type head 4. Due to the newly directed normal force Fn, the now effective force triangle among the axial force Fa and the normal force Fn, result in a radial force Fr, which, in contrast to FIG. 2, points to a point on the abutment surface 11 that would be adjacent to the axis on an unbent drive shaft 3 and, thus, in the axial direction A of the drive shaft 3. As a result, the radial force Fr necessarily endeavors to lead back the eccentrically deflected, unattached shaft end 31. Further, the wobble moment $M_T$ is likewise directed toward the axial direction A, since in contrast to FIG. 2, the contact point between the thrust mushroom-type head 4 having the radius of curvature r and the crown-face abutment surface 11 having the radius of curvature R is now displaced radially to the outside by the distance a. The restoring radial force F, increases as the difference in the radii of curvature R and r decreases, and the deflection e increases.

What is claimed is:

1. A drive unit comprising:
   a) a drive shaft having an unattached, overhung-mounted shaft end, said unattached, overhung-mounted shaft end having radial forces acting upon it which bends said drive shaft out of its centrical axial position; and
   b) a housing part having a crown-shaped, convex, abutment surface, said abutment surface abutting said unattached, overhung-mounted shaft end of said drive shaft, whereby an abutment of said abutment surface and said unattached, overhung-mounted shaft end results in a force that, given an eccentric abutment, bends said drive shaft back to its centrical axial position.

2. The drive unit of claim 1 further comprising:
   c) an electromotor connected with said drive shaft; and
   d) a worm gear formed on said drive shaft,
   wherein said drive shaft abuts, at its motor-side, free shaft end against a cup-bottom-side abutment surface of a said motor housing.

3. The drive unit of claim 2 further comprising:
   e) a first bearing supporting said drive shaft at a first side of said worm gear, and a second bearing supporting said drive shaft at a second side of said worm gear, whereby said drive shaft is supported in an overhung bearing arrangement for the free shaft end.

4. The drive unit of claim 2 wherein said electromotor is a commutator motor having a commutator and having a laminated rotor core.

5. The drive unit of claim 4 wherein said commutator of said commutator motor provided as a drive motor is arranged on said drive shaft between said second bearing and laminated rotor core of said electromotor.

6. The drive unit of claim 1 further comprising a convex-curved, thrust mushroom-type head provided on said free shaft end of said drive shaft.

7. The drive unit of claim 6 wherein said thrust mushroom-type head includes a separate component part and is accommodated by said free shaft end of said drive shaft.

8. The drive unit of claim 7 wherein said thrust mushroom-type head is a plastic component part.

9. The drive unit of claim 6 wherein said convex abutment surface of said housing part has a radius of curvature R and said thrust mushroom-type head has a radius of curvature r which is smaller than R.

* * * * *